D. S. WAGNER.
Cultivator.
No. 201,136. Patented March 12, 1878.
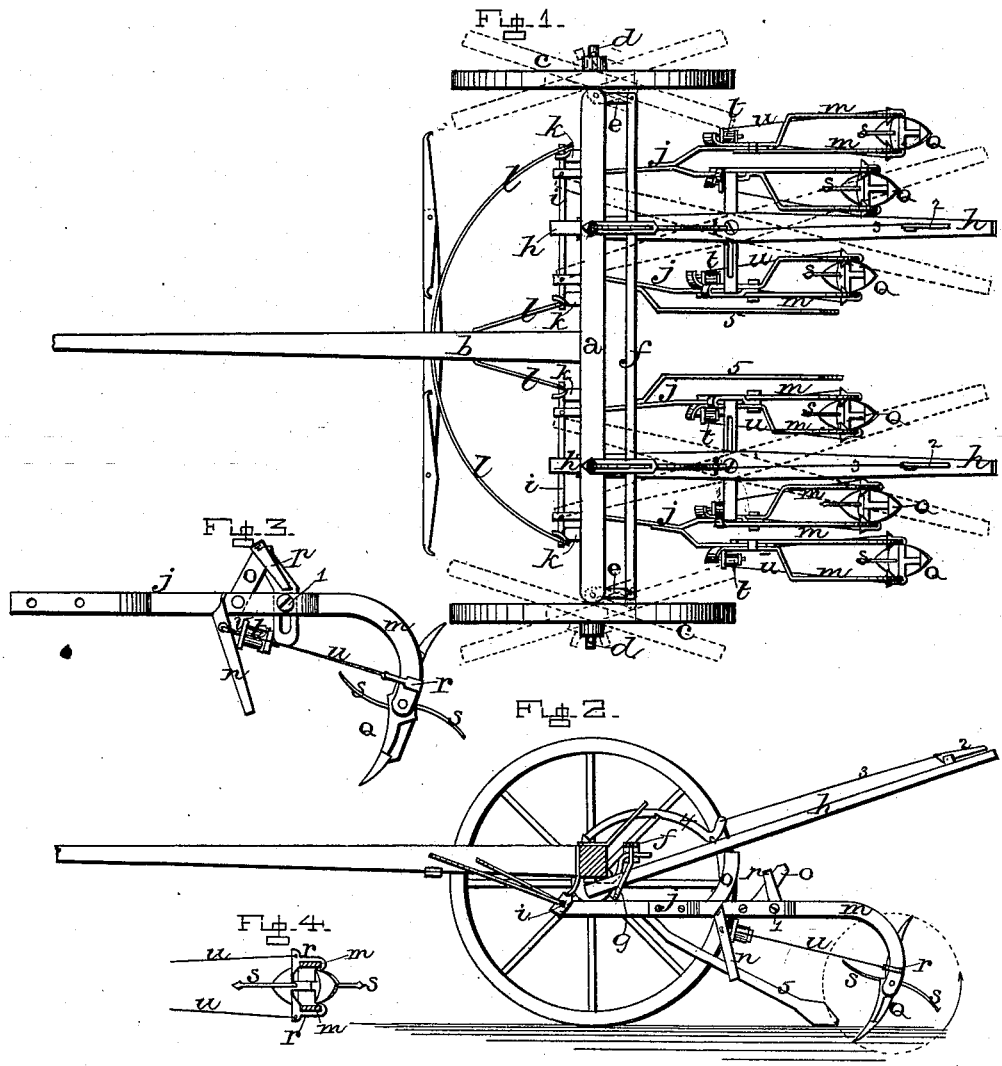
WITNESSES.
J. W. Garner
R. M. Barr.
INVENTOR.
D. S. Wagner,
per
F. A. Lehmann,
Atty.

UNITED STATES PATENT OFFICE.

DAVID S. WAGNER, OF CARLISLE, PENNSYLVANIA.

IMPROVEMENT IN CULTIVATORS.

Specification forming part of Letters Patent No. 201,136, dated March 12, 1878; application filed January 30, 1878.

*To all whom it may concern:*

Be it known that I, DAVID S. WAGNER, of Carlisle, in the county of Cumberland and State of Pennsylvania, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in cultivators; and it consists in the arrangement and combination of parts whereby the machine can be guided by the handles which control the gangs or shovels, and whereby the shovels are made to revolve half around whenever they strike an obstruction, and thus prevent them from breaking, as will be more fully described hereinafter.

The accompanying drawings represent my invention.

$a$ represents the axle; $b$, the tongue, and $c$ the driving-wheels. The spindles $d$, upon which these driving-wheels turn, are pivoted to the under side of the axle, and have their inner ends bent at right angles, and extending a suitable distance beyond the rear side of the axle. These rear ends $e$ are connected together by a suitable connecting-rod, $f$, which extends clear across the machine, and which has the loops $g$ projecting downward and forward from its under side. Through these loops pass the handles $h$, to which the gangs or cultivators are attached, and which handles have their front ends projecting forward and bearing upon the tops of the rods $i$, to which the cultivator-beams $j$ are fastened.

By pivoting the spindles to the under side of the axle and connecting their rear ends together by a connecting-rod, it is evident that the spindles carrying the wheels upon them will be given a free play through a portion of a circle, the centers of which are the pivots upon which the spindles are fastened.

When the rear ends of either one or both of the handles are moved to one side, the front ends, catching in the loops that project from the under side of the connecting-rod, cause the connecting-rod to move in an opposite direction, and as the rod moves it draws the spindles around, so as to move the wheels around through a portion of a circle. By thus moving the wheels the driver is enabled to manage the gangs or cultivators, and control the direction of the machine at the same time, without any additional effort on his part.

Suspended from the front side of the axle by the hanger $k$, and braced in position by the braces $l$, are the rods or bars $i$, to which the cultivator-beams $j$ are secured. These beams extend backward, and have their rear ends $o$ turned upward, as shown. The standards $m$ are pivoted to the rear ends of the beam just at that point where it begins to move upward, and one of the standards has its end bent so as to project downward at a slight rearward inclination, and thus form the shield $n$.

In between the two standards, just to the rear of where they are pivoted to the beam, is secured, by means of the set-screw 1, the slotted hooked stop $p$, which regulates the distance which the standards shall move upward in case they should strike a slight obstruction. The upper end of this stop $p$, being hooked, catches over the upwardly-turned end $o$ of the beam, and this prevents the standards from rising either too far upward or dropping too low toward the ground. By adjusting this stop up and down, the distance which the standards can rise upward when they strike an obstruction, or the depth which the shovels shall cut into the ground, may be readily controlled.

Instead of there being but a single standard and a shovel attached directly to it, I use two standards, $m$, between the lower ends of which is placed the revolving shovel $q$. The body of this shovel is made of common cast-iron, and to each end, turned in opposite directions, are bolted or otherwise removably attached the steel points or shovels. In case one of these points should be broken, it can be readily removed and a new one attached. These shovels $q$ are pivoted between the lower ends of the standards, and can revolve entirely around, as shown, and to which standards are secured spring-catches $r$, which project beyond the inside edge of each standard and catch over the front edge of the body of the shovel, and thus hold it in position until the point of the shovel catches against a stone, root, or other obstruction, which would have a tendency to break the shovel or stop the team. These spring-catches being regulated so as to give way at a certain amount of pressure as soon as this pressure is reached, the catches open outward and allow the shovel-point to give backward until the rod s, which projects outward from the side of the body of the shovel, strikes the ground, when the forward motion of the team will cause the shovel to continue turning around until the opposite point catches in the ground, when it at once takes the place of the point which caught against the obstruction. By means of these rods s, which are suitably curved, the other point of the shovel is instantly brought into play without skipping any ground whatever, except the length of the entire shovel from point to point.

Secured to the shield n is a rubber or other spring, t, which is clamped between the plate v and the adjusting-nut, and to each end of the plate v is secured a rod, u, which extends backward, and has its other end fastened to the spring-catch which holds the shovel in position. By regulating the pressure of this spring upon the rods u, the catch may be made to act with any desired amount of pressure upon the point of the shovel that is in the ground.

By having the shovels thus revolve, it is evident that there is no danger of one of the points of the shovels being broken; that the stoppage of the team will never occur by the shovels catching against an obstruction; that the shovels instantly readjust themselves; that there is little or no ground skipped when one or more of the shovels strike an obstruction; and that the driver need not carry a number of break-pins or other devices along with him, so as to be constantly stopping the team and adjusting the shovels as fast as they strike against a stone or other substance which interferes with their action.

Where the ground is entirely free from obstructions of all kinds, and one set of points or shovels have become dull, the dull set may be removed from the body and taken to a blacksmith-shop to be sharpened while the other is in use.

Upon the top of each handle is placed a small thumb-lever, 2, which is connected by the rod 3 with a ratchet bar or rod, 4, by means of which either gang may be held suspended above the ground without any further effort on the part of the driver. Both gangs may be thus supported, or either one alone, as occasion may require.

As here shown, the gangs are arranged with three shovels, each placed at any desired distance apart; but, should it be desired to move them nearer together or farther apart, it is only necessary to loosen the clamp-screw which passes through the handle, and then, by means of the slots made in the upwardly-turned ends o of the beams, the shovels may be adjusted at will.

When it is desired, shovels or plows of any suitable description may be applied to the sides of the beams where the corn-shields 5 are secured, thus making a cultivator with eight double-pointed shovels, which will wear twice as long as single-pointed ones, and will cultivate thoroughly a width of forty-eight inches.

The front ends of the beams j are fastened to the rods i by means of set-screws, so that the beams can be adjusted back and forth at will for the purpose of regulating the distance between the shovels.

It will be noticed that the weight of the standards shall rest on the slotted hooked stop p where there are no obstructions; but when one shovel strikes a slight obstruction it rises, beam and all, except the other shovels, which are allowed to keep their depth until the hook-stop p catches over the upturned end o, should it rise so high.

I am aware that a revolving coverer is not new, and this I disclaim.

Having thus described my invention, I claim—

1. In a cultivator, the combination of the double standards m, double-pointed shovel q, rods s, catches r, rods u, and spring t, substantially as shown.

2. In a cultivator, a double-pointed shovel, q, provided with the rods s, in combination with the spring-catches r and double standards m, the parts being combined to operate in such a manner that the point of the shovel remains in the earth until it strikes an obstruction, when it automatically revolves halfway around, and at once enters the earth with its other point, substantially as described.

3. The combination of the connecting-rod f, pivoted spindles e, loops g, levers h, rods i, and connecting devices for uniting the beams j to the handles, substantially as set forth.

4. The combination of the revolving shovel, catches to hold it in position, connecting-rods, and spring, substantially as shown.

5. The adjustable stop p, in combination with the standards and the turned-up end o of the beam, substantially as described.

In testimony that I claim the foregoing I have hereunto set my hand this 19th day of January, 1878.

DAVID S. WAGNER.

Witnesses:
E. B. LEONARD,
T. H. RAMSEY.